United States Patent [19]
Floyd

[11] 4,355,662
[45] Oct. 26, 1982

[54] REPAIRABLE ACCUMULATOR DEVICE

[75] Inventor: James K. Floyd, Yorba Linda, Calif.

[73] Assignee: VSI Corporation, Pasadena, Calif.

[21] Appl. No.: 258,458

[22] Filed: Apr. 29, 1981

[51] Int. Cl.$^3$ .............................................. F16L 55/04
[52] U.S. Cl. ..................................... 138/30; 220/85 B
[58] Field of Search .................... 138/26, 30; 220/85 B

[56] References Cited

U.S. PATENT DOCUMENTS 3,593,746 7/1971 Allewitz et al. ......................... 138/30
3,774,802 11/1973 O'Cheskey ........................ 138/30 X
3,901,278 8/1975 Feistel .................................. 138/30
4,068,684 1/1978 Greer ................................... 138/30
4,317,472 3/1982 Zahid ................................... 138/30

*Primary Examiner*—James E. Bryant, III
*Attorney, Agent, or Firm*—Arthur B. Colvin

[57] ABSTRACT

A hydraulic accumulator or pulse dampener device susceptible of being repaired by replacing the bladder assembly through a removable gas charging valve. The device is characterized by a structure connecting the bladder assembly to elements of the gas charging valve assembly whereby a secure connection between the parts may be effected without damaging the bladder.

4 Claims, 4 Drawing Figures

REPAIRABLE ACCUMULATOR DEVICE

BACKGROUND OF THE INVENTION

1. Field of the Invention

The present invention is in the field of hydraulic accumulator or pulse dampener devices and relates more particularly to a top repairable device of the type described.

2. The Prior Art

Hydraulic accumulator devices typically comprise pressure vessels having a gas charging port at one end and an oil port at the other. A bladder disposed within the vessel divides the same into two chambers communicating, respectively, with the gas and oil ports. Gas under pressure is loaded into the bladder, to expand the same with resultant shifting of a valve to seal the oil port. When the pressure in the conduit exceeds the pressure in the bladder, the valve is unseated, permitting the ingress of hydraulic fluid into the pressure vessel, with consequent compression of the gasses within the bladder and resultant storage of energy. When the pressure in the conduit falls to a level below the pressure in the bladder, the gases in the bladder expand with resultant return of stored energy to the hydraulic system.

Since the bladder is typically made of elastomeric material and in the course of normal operation may undergo innumerable cycles of stretching and contraction and since the liquid medium contacting the bladder may include abrasive particulate materials etc., the bladder may ultimately fail. Since the connection between the oil port and the conduit is often inaccessible and since the gas charging port is normally disposed in a far more readily available position, it is highly desirable, in the event of bladder failure, to be able to replace the bladder through the gas charging port.

In view of the enormous pressures typically encountered in use, it is conventional practice to shield the one way gas charging valve member leading to the interior of the bladder by disposing a protective cup or cylinder about the stem of the valve, which might otherwise be accidentally sheared, with resultant sudden and disasterous release of pressure.

In top replaceable bladders, the connection between the bladder and the vessel is typically effected by a hollow stem member bonded to the bladder and projecting outwardly through a fitting mounted in the gas charging port. Under such circumstances, great difficulties have been experienced in dependably and rigidly securing the stem leading from the bladder to the fitting since, as noted, the stem is located within a cup and while it is feasible to apply a tightening tool to a jam nut lodged in the area between the stem and the cap, no provision is made for simultaneously gripping the stem to permit effective tightening of the jam nut.

In the event that the stem should rotate in the course of tightening the jam nut, it will be appreciated that a relative movement will occur between the bladder and the fitting, with the resultant likelihood of damage to the bladder.

SUMMARY OF THE INVENTION

The present invention may be summarized as directed to improvements in top repairable accumulator devices of the type wherein the bladder is mounted by connection of a stem bonded to the bladder to components mounted within the gas charging port of the accumulator device.

In accordance with the invention, a fitting to be mounted in the gas charging port includes a flange including a transverse wall portion having a bore which is eccentric.

The bladder assembly includes a stem, housing a one-way valve. The exterior portion of the stem, at the junction between the stem and the bladder, is provided with a key portion shaped complementally to the eccentric bore in the fitting. Since the key interfits with the eccentric bore, the same is non-rotatably disposed in the fitting and, accordingly, a jam nut can be dependably and securely threaded over the stem by a tool inserted into the cup without fear of damaging the bladder.

It is accordingly an object of the invention to provide an improved top repairable hydraulic accumulator assembly.

A further object of the invention is the provision of a device of the type described wherein the stem supporting the bladder may be dependably mounted without danger of damaging the bladder.

To attain these objects and such further objects as may appear herein or be hereinafter pointed out, reference is made to the accompanying drawings, forming a part hereof, in which.

Figure 1:
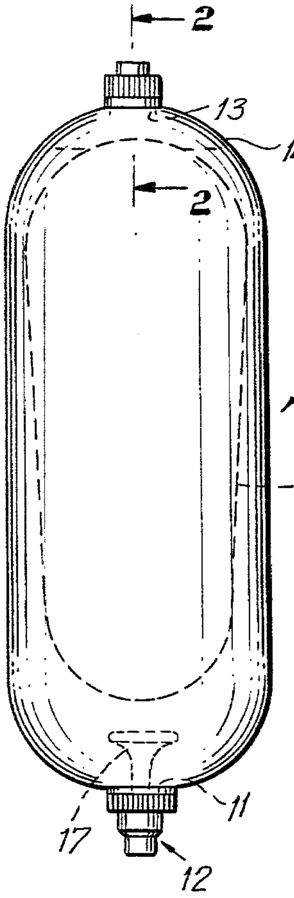
FIG. 1 is a side elevational view of a top repairable accumulator device.

Turning now to the drawings, the accumulator device may include a pressure vessel 10 having an oil port 11 at the lower end thereof, a fitting 12 being provided in surrounding relation of the oil port for enabling connection of the device to a hydraulic line. A gas charging port 13 is formed at the upper end 14 of the vessel.

A bladder member 15 carries a bladder support stem 16 at its upper end, the stem 16 including a bore (not shown) leading to the interior of the bladder.

A poppet valve 17 may be mounted in the oil port for movement between opening and closing relation thereof in accordance with the contracted or expanded positions, respectively, of the bladder 15.

As is known, a one-way valve such as a Schrader valve (not shown) may be mounted within the stem assembly 16, providing a means for introducing gas under pressure into the bladder. When the pressure within the bladder exceeds the pressure within the conduit leading to the oil port, the bladder will expand to react against the poppet 17 so that the poppet will be shifted to sealing position of the oil port, the poppet being in open position when the pressure of the hydraulic fluid exceeds the pressure within the bladder sufficiently to compress the gas in the bladder.

The multiple cycling resulting in expansion and contraction of the bladder and abasive particulate materials entrained in the hydraulic fluid, may ultimately compromise the bladder, resulting in rupture thereof, whereupon it will be necessary to replace the bladder.

In order to avoid the necessity for demounting the entire accumulator device from the conduit connected to the oil port, it is highly desirable to provide a fitting, as shown, in the gas charging port 13 which, when removed, will enable replacement of the bladder through the gas charging port. To this end there is provided in accordance with the invention a fitting 18 removably mounted in the gas charging port 13.

The means whereby the fitting is secured in position is known per se, for instance from U.S. Pat. No. 2,936,787, and will thus be only briefly described herein.

More particularly, the generally cylindrical hollow fitting 18 includes an annular flange 19 at its lower end, the maximum diameter of the flange 19 being slightly smaller than the inner diameter of the port 13 to enable insertion into the interior of the vessel.

A split collar member is formed of sections 20, 21, each of which defines a substantially 180° arc. The metallic sections 20, 21 are bonded to an elastomeric ring 22. The sections 20, 21 include upwardly directed neck portions 23, 24, respectively, whose diameter is slightly less than the interior diameter of the port 13. Sections 20, 21 also include arcuate large diameter portions 25, 26, respectively, beveled to conform to the bevel of the interior walls of the pressure vessel surrounding the port 13.

The noted construction permits the fitting carrying the stem 16 and bladder 15 to be inserted into the interior of the pressure vessel, following which the split collar assembly may likewide be inserted into the interior, by folding the elastomeric material 22 about a fold line coinciding with the ends of the arcuate segments 20 and 21.

After the split collar assembly has been disposed within the interior of the vessel, the elastomeric substance 22 will again resiliently return to its original condition, following which the fitting 18 may be shifted outwardly, whereupon the flange 19 will bear against the undersurface of the arcuate segments 20, 21, following which it will be perceived that the fitting cannot inadvertently be removed outwardly through the charging port 13.

In order to effect removal, the described steps must be reversed, i.e. the fitting first shifted into the interior of the vessel, a procedure which can be effected only after all pressure has been removed from the interior of the vessel, thereby providing a safety feature.

The assembly of the fitting to the pressure vessel is completed by the introduction of a washer member 27 and an O-ring 28 into the annular space defined between the side wall 29 of the fitting and the gas charging port 13.

A compression washer 30 is mounted over the side wall 29 of the fitting, the washer including a depending leg 31 which enters into the previously described annular space. A locking nut 32 mounted over threaded portion 33 of the fitting provides a fluid-tight clamped connection between the noted parts.

The principal innovation of the present device deals with the manner in which the stem 16 bonded to the bladder 15 is secured to the fitting 18.

The fitting 18 includes an axially directed bore 34 formed through the top wall 35 thereof. The bore 34 adjoins a recess 36 of greater diameter than the bore 34. An eccentric or stop member 37 is formed within the recess area 36.

Figure 3:
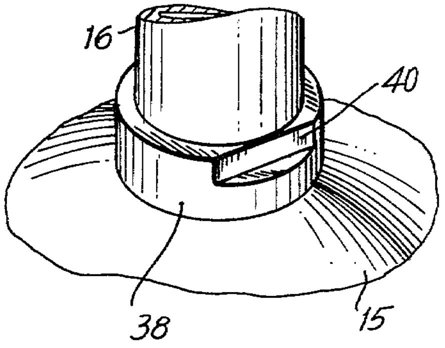
FIG. 3 is a perspective view of the junction between the bladder and the stem leading to the bladder.
Figure 4:
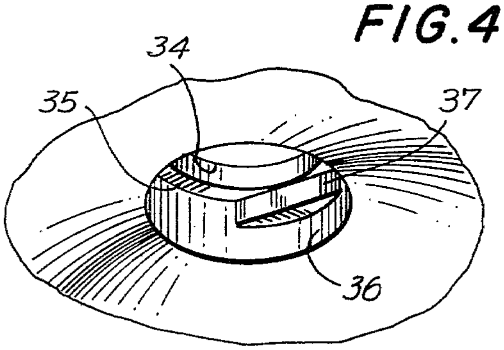
FIG. 4 is a perspective view from below of the aperture in the gas charging valve closure fitting.
Figure 2:
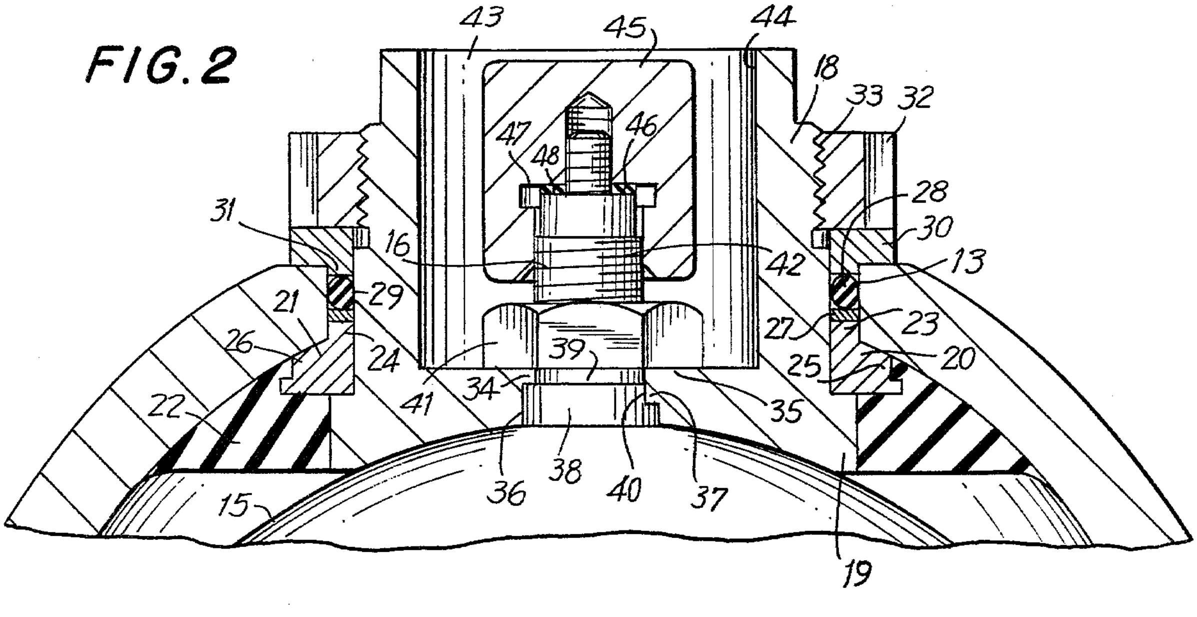
FIG. 2 is a greatly magnified vertical sectional view on the line 2—2 of FIG. 1.

The stem 16 includes an enlarged annular portion 38 adjacent the junction of the stem with the bladder 15 and a reduced diameter shank portion 39. The annular portion 38 includes a recess or key portion 40. As will be apparent from an inspection of FIGS. 3 and 4, the enlarged portion 38 of the stem 16 fits within the recess 36, with the eccentric 37 mating with the key portion 40, whereby the stem 16 is non-rotatably received within the bore 34.

Due to the non-rotatable interfit of the stem 16 in the bore 34, it is possible tightly to screw jam nut 41 on the threaded portion 42 on the shank 39 of the stem 16, without the necessity of applying an additional torque resistant force to the stem. Such tightening may be effected by inserting a suitable socket into the cup-like cylindrical space 43 within fitting 18 between the outer diameter of the jam nut 41 and the inner wall portion 44 of the cup member.

A suitable valve cover or cap member 45 may be threaded over the upper end of the threaded shank portion 42, a gasket member 46 being preferably disposed between downwardly facing surface 47 of the cap and the upper end portion 48 of the stem.

From the foregoing, it will be appreciated that there is provided in accordance with the present invention, a top repairable accumulator device wherein a stem bonded to a bladder may be firmly and effectively connecting to a fitting mountable in the gas charging portion of the accumulator without fear that the torque applied to the jam nut to secure the stem in position will rotate and possible damage the bladder.

A ruptured bladder may be readily removed and replaced from above, i.e. through the gas charging port, without the necessity for disconnecting the accumulator from the hydraulic line.

While the interfit between the stem of the bladder and the fitting is illustratively a flat portion on each of the noted members, which flat portions mate in the assembled position, it will be readily perceived that any eccentric relation of the parts which prevents relative rotation will be satisfactory to effect the desired purpose.

Accordingly, the invention is to be broadly construed within the scope of the appended claims.

Having thus described the invention and illustrated its use, what is claimed as new and is desired to be secured by Letters Patent is:

1. A top repairable accumulator device comprising, in combination, a pressure vessel having an oil port at a bottom end and a gas charging port at a top end, a gas charging valve assembly mounted in said top end, said valve assembly including a fitting member removably mounted in said gas charging port, a generally cylindrical chamber on said fitting externally of said port, a transverse wall portion on said fitting having a bore therein, said bore being aligned generally coaxially of said chamber, a bladder assembly disposed within said vessel, said assembly including a bladder having an opening, a generally cylindrical hollow valve mounting stem disposed in said opening and bonded to said bladder, said stem having an external thread portion, said stem extending through said bore of said fitting and into said cylindrical chamber, eccentric interfit means extending between said stem and said fitting for keying said stem against rotation relative to said fitting, and a jam nut disposed within said chamber and threadedly connected to said thread portion of said stem and clamping said stem to said fitting.

2. An accumulator in accordance with claim 1 wherein said eccentric interfit means comprises complemental flat portions on said stem and said fitting.

3. A top repairable accumulator device comprising, in combination, a pressure vessel having an oil port at one end and a gas charging port at the other end, a gas charging valve assembly mounted in said other end, said valve assembly including a fitting cup member removably mounted in said port, said fitting member including a cylindrical shank extending outwardly through said port and having a flange portion within said vessel, a split collar member having a bore mounted on said shank, said collar having an outer diameter greater than said port, the diameter of said flange being smaller than the diameter of said port and greater than the diameter of the bore of said collar member, a lock nut threadedly connected to said shank externally of said vessel, said nut bearing against portions of said vessel surrounding said port, thereby clampingly to urge said flange against said collar and said collar against the interior walls of said vessel surrounding said port, said fitting including a generally cylindrical chamber outside said vessel, a valve mounting bore formed in said fitting in coaxial alignment with said shank, said mounting bore including a portion eccentric in transverse section, a bladder assembly disposed within said said vessel, said assembly including a bladder member having a stem bonded thereto, a threaded portion on said stem, a key portion on said stem non-rotatably disposed within said eccentric portion of said fitting and a jam nut threadedly mounted on said thread portion of said stem within said chamber and bearing against said fitting thereby removably securing said support member and bladder in mounted position within said vessel.

4. An accumulator device in accordance with claim 3 wherein said eccentric portion of said bore and key portion of said shank comprise complemental flat portions.

* * * * *